UNITED STATES PATENT OFFICE.

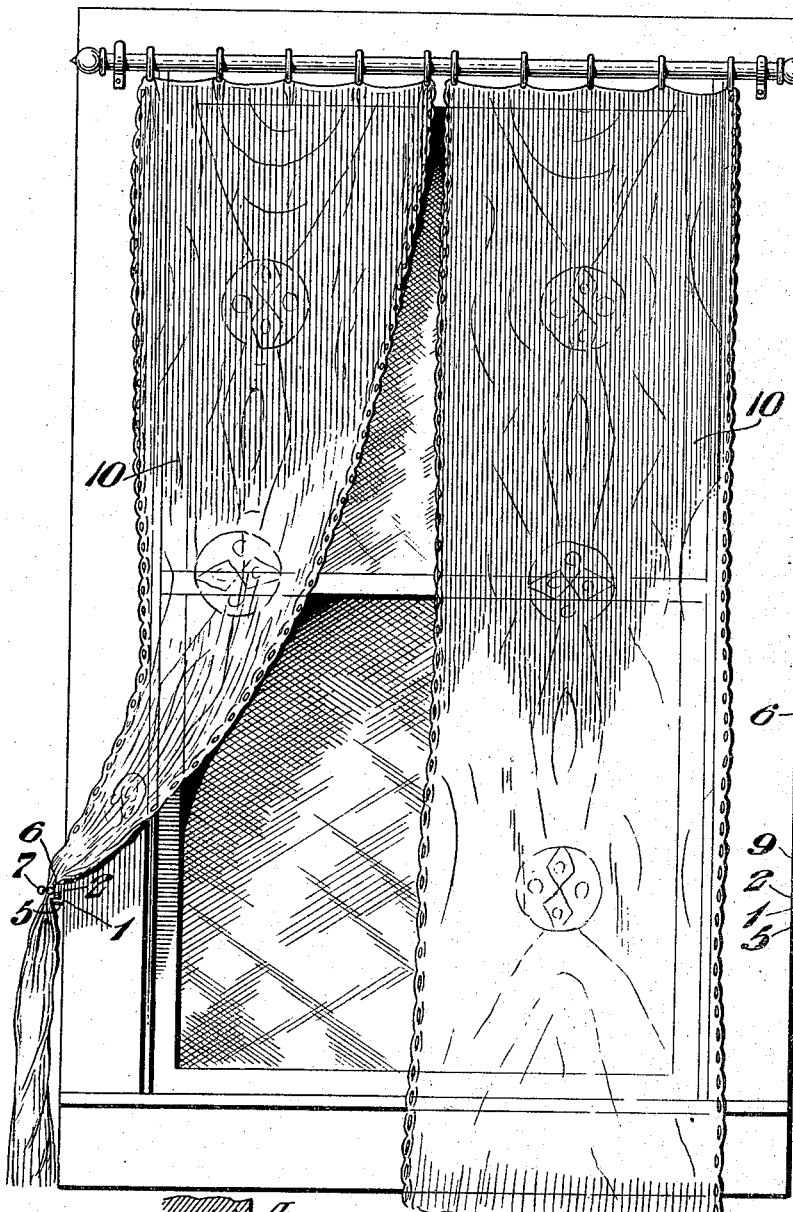
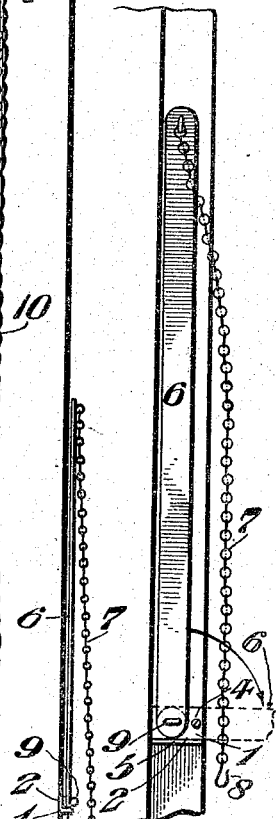

JOSEPH CHAPMAN AND RUTH P. CHAPMAN, OF BRYN MAWR, PENNSYLVANIA.

CURTAIN-HOLDER.

1,191,666.      Specification of Letters Patent.      Patented July 18, 1916.

Application filed January 8, 1916. Serial No. 70,926.

*To all whom it may concern:*

Be it known that we, JOSEPH CHAPMAN and RUTH P. CHAPMAN, both citizens of the United States, residing at Bryn Mawr, in the county of Montgomery, State of Pennsylvania, have invented a new and useful Curtain-Holder, of which the following is a specification.

Our invention consists of a device for holding curtains in open condition, the same embodying arms that may be placed in horizontal position so as to allow the lower portions of the curtains to be retained thereon, provision also being made for sustaining said arms positively in said position, and preventing them from dropping therefrom, and for preventing displacement of the curtains from said arms, as will be hereinafter set forth.

The invention is satisfactorily illustrated in the accompanying drawing, but the important instrumentalities thereof may be varied, as long as they are included in the scope of the claim.

Figure 1 represents a front view of a curtain holder in operative position embodying our invention. Fig. 2 represents a side elevation thereof on an enlarged scale, in inoperative position. Fig. 3 represents a top or plan view of the holder in operative position, the portion of the window frame with which it is connected being in horizontal section. Fig. 4 represents a perspective view of a detached member of the device.

Similar numerals of reference indicate corresponding parts in the figures.

Referring to the drawings, 1 designates brackets of angular form, the upper vertical limb 2 of each of which having openings therein to receive the screws 3 and 4, whereby the brackets may be screwed or otherwise secured to the opposite sides of a window frame, the lower limbs 5 of said brackets projecting horizontally outward from said limbs 2 and adapted to form supporting ledges for a purpose to be hereinafter explained.

6 designates swinging arms formed of bars of suitable metal or other material, one end of each of which is adapted to be connected with the bracket 1 by the screw 3, said end being mounted on the shank of said screw, whereby the arm has an axis thereon, so that it may be placed in horizontal, and consequently operative position, as shown in Figs. 1 and 3, or placed in vertical or inoperative position, as shown in Fig. 2.

Connected with the free ends of the arms are the chains, cords if desired, or some other suitable members 7, which are provided on the ends opposite to their places of connection with the brackets with the hooks 8, which are adapted to be fitted on the heads 9 of the screw 3, said heads being of the form of eyes, as most plainly shown in Fig. 3.

The operation is as follows:—The arms 6 are turned down to horizontal positions when as is evident, their axial end portions rest on the limbs 5 of the brackets as ledges and retain the arms in said horizontal positions, without liability to drop below said positions. The lower portion of the curtains are then turned to the right and left and deflected over said arms, and so held or hung in open condition, as shown particularly on the left hand side of Fig. 1. Then the chains or flexible members 7 are placed on the outsides of the portions of the curtains hung over the arms, so as to prevent said portions from slipping from the arms or being blown from the same. When the curtains are to be placed in closed condition, as shown on the right hand side of Fig. 1, the chains are disconnected from the eyes 9, whereby they relieve the curtains of their holding power, then the curtains may be raised or moved clear of the arms, and the latter raised and placed in upright position on the window frame, as shown in Fig. 2, whereby they remain either by friction with said frames, or being placed out of center, say to the left, or by tightening the screws 3 if so desired.

Having thus described our invention what we claim as new and desire to secure by Letters Patent, is:—

A curtain holder comprising an arm, means for pivotally attaching one end of the arm to a window frame, said means being provided with an eye, and a flexible member secured to the other end of the arm and provided with means for engaging said eye, said flexible member being adapted to retain a curtain on said arm.

JOSEPH CHAPMAN.
                RUTH P. CHAPMAN.

Witnesses:
     E. M. HURERITZ,
     ANNA M. DOMAN.